United States Patent [19]
Khelifa

[11] Patent Number: 5,620,367
[45] Date of Patent: Apr. 15, 1997

[54] AIR DRYING INSTALLATION FOR MOTOR VEHICLES

[75] Inventor: Noureddine Khelifa, Stuttgart, Germany

[73] Assignee: Behr GmbH & Co., Stuttgart, Germany

[21] Appl. No.: 403,961

[22] Filed: Mar. 15, 1995

[30] Foreign Application Priority Data

Mar. 15, 1994 [DE] Germany ............................ 44 08 796.9

[51] Int. Cl.$^6$ .................................................. B60H 3/00
[52] U.S. Cl. ................. 454/156; 96/127; 96/130
[58] Field of Search ................. 454/156; 96/118, 96/127, 130; 62/94, 271

[56] References Cited

U.S. PATENT DOCUMENTS

| | | | |
|---|---|---|---|
| 2,248,225 | 7/1941 | Fonda | 96/130 X |
| 2,257,478 | 9/1941 | Newton | 62/94 X |
| 3,263,400 | 8/1966 | Hoke et al. | 96/130 X |
| 3,368,327 | 2/1968 | Munters et al. | 96/127 X |

FOREIGN PATENT DOCUMENTS

| | | |
|---|---|---|
| 2050898 | 4/1972 | Germany. |
| 3626887 | 2/1988 | Germany .................... 96/127 |
| 1211101 | 11/1970 | United Kingdom ............. 96/127 |

*Primary Examiner*—Harold Joyce
*Attorney, Agent, or Firm*—Foley & Lardner

[57] ABSTRACT

Apparatus for reducing the air moisture in a passenger compartment of a motor vehicle. The apparatus has a housing which is connected to a supply air duct and a discharge air duct of the passenger compartment. In the housing, there is arranged a secondary air chamber and a main air chamber, following in the direction of flow to the passenger compartment. Arranged between the secondary air chamber and the main air chamber is an air-permeated wall element of hygroscopic material for dehumidifying the air. To ensure dehumidification, there is arranged a second secondary air chamber, which is separated from the main air chamber by a second air-permeated wall element of hygroscopic material. For controlling the air volume, in each air chamber there is arranged an air flow control element, such that, in a first position of the air flow control elements, an air flow entering the one secondary air chamber is ducted through the first wall element and, as a dried air flow, is fed via the main air chamber to the supply air duct of the passenger compartment and that an air flow ducted into the main air chamber as a desorption flow is directed through the second wall element and discharged through the other secondary air chamber. In a second position of the air flow control elements, the air ducting is changed correspondingly.

27 Claims, 9 Drawing Sheets

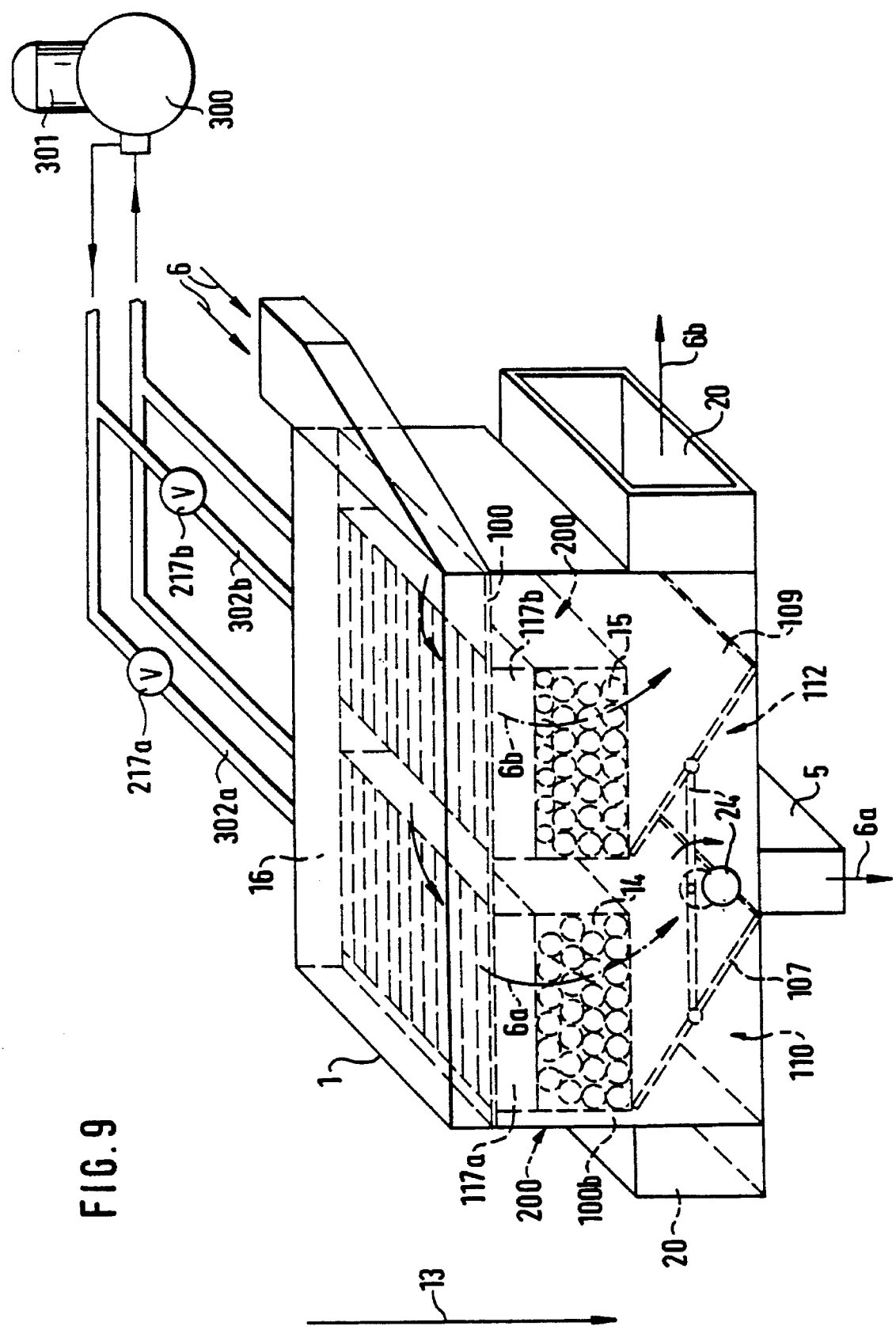

AIR DRYING INSTALLATION FOR MOTOR VEHICLES

BACKGROUND OF THE INVENTION

The invention relates to an apparatus for reducing the air moisture in a passenger compartment of a motor vehicle, in particular of a motor vehicle with little heat waste.

Such an apparatus is disclosed in DE-A 20 50 898, in which a wall element is formed by a flexible band, namely a textile band impregnated with lithium chloride. The band is moved in a circulating manner by means of a drive, so that a regenerated section of band is continuously exposed to the air flow to be dried. The regeneration is performed by leading the band past a heating device. Problems are caused by the salt solutions on metals, which results in corrosion. Also, because of a possible instability from crystallizing of the salt, the desorption temperature must be controlled or the solution concentration must be constantly checked out and a heating device provided for desorption has to be extremely powerful in order to ensure adequate regeneration of the quickly circulating band. Even so, complete drying of the air is virtually impossible.

SUMMARY OF THE INVENTION

An object of the invention is to provide an apparatus for air dehumidification with high stability, efficient air drying and a greater temperature range for desorption.

The above object is achieved by an apparatus for reducing the air moisture in a passenger compartment of a motor vehicle, which includes a housing connected to a supply air duct and a discharge air duct of the passenger compartment, a secondary air chamber and a main air chamber formed in the housing, the secondary air chamber being separated from the main air chamber by an air-permeable wall element of hygroscopic material, a second secondary air chamber separated from the main air chamber by a second air-permeable wall element of hygroscopic material, and at least one air flow control element for controlling the air volume flow. In a first position of the air flow control elements, a first air flow, ducted via the first secondary air chamber and the main air chamber, flows through the first wall element and, as a dried air flow, is fed to the supply air duct of the passenger compartment and a second air flow, ducted via the main air chamber and the second secondary air chamber, as a desorption air flow, flows through the second wall element and is discharged. In a second position of the air flow control elements, the air ducting is changed correspondingly.

The arrangement of a second wall element as an intermediate wall between the main air chamber and a second secondary air chamber creates a second drying path, so that initially the first drying path is used, but as soon as the efficiency of the wall element in the first drying path is exhausted, the second drying path is used. The switch is made by means of the air flow control elements which direct the air flow to be dried. If one drying path is being used, the desorption of the wall element in the second drying path is performed at the same time by another air flow, which may be branched off from the discharge air flow fed to the apparatus.

In a further development of the invention, in each air chamber there is arranged a damper, approximately parallel to the wall element, as an air flow control element. The damper in a first position and in a second position lies approximately in a diagonal plane. The air chamber accommodates either position of the damper and is divided into an air inlet and into an air outlet. The wall element respectively bounding the main air chamber and the secondary air chamber lies between an air inlet and an air outlet. The air flow ducted through the air inlet to the air outlet is directed over the full length of the wall element. The arrangement of the dampers in the air chambers ensures simple switching over from the one drying path to the other drying path, such that the wall element lying in the drying path and not being used at the time is desorbed by a partial air flow, in particular a heated partial air flow.

The air inlets are preferably connected jointly to the discharge air duct, in particular via a diffuser. Thus, the discharge air flow is divided into a partial air flow to be dried and a partial air flow forming the desorption air flow. In this case, the ratio of the division of the discharge air flow can be fixed by the size of the respective air inlets specified in the design. Thus, with a larger main chamber and a correspondingly designed diffuser, a larger partial air flow is used as the desorption air flow.

In a further development of the invention, the hygroscopic material is a sorbent, in particular a zeolite, silica gel, aluminum hydroxide or the like. In this case, the wall element is designed as an air-permeable cage into which the sorbent is introduced as a loose fill. The grain size of the loose fill is on average about 3 mm.

In order to avoid leakage flows through the wall element, possibly due to settlement of the loose fill, it is envisaged to connect the wall element to a store chamber containing loose fill material, from which chamber sorbent material successively slips—under the effect of gravitational force—into the cage of the wall element. Changes in volume caused by shaking or abrasion thus cannot result in gaps in the wall element, so that leakage flows are avoided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the general description given above and the detailed description of the preferred embodiments given below, serve to explain the principles of the invention, in which:

FIG. 9 is another exemplary embodiment of the apparatus.

DETAILED DESCRIPTION OF THE PREFERRED EMBODIMENTS

Figure 1:
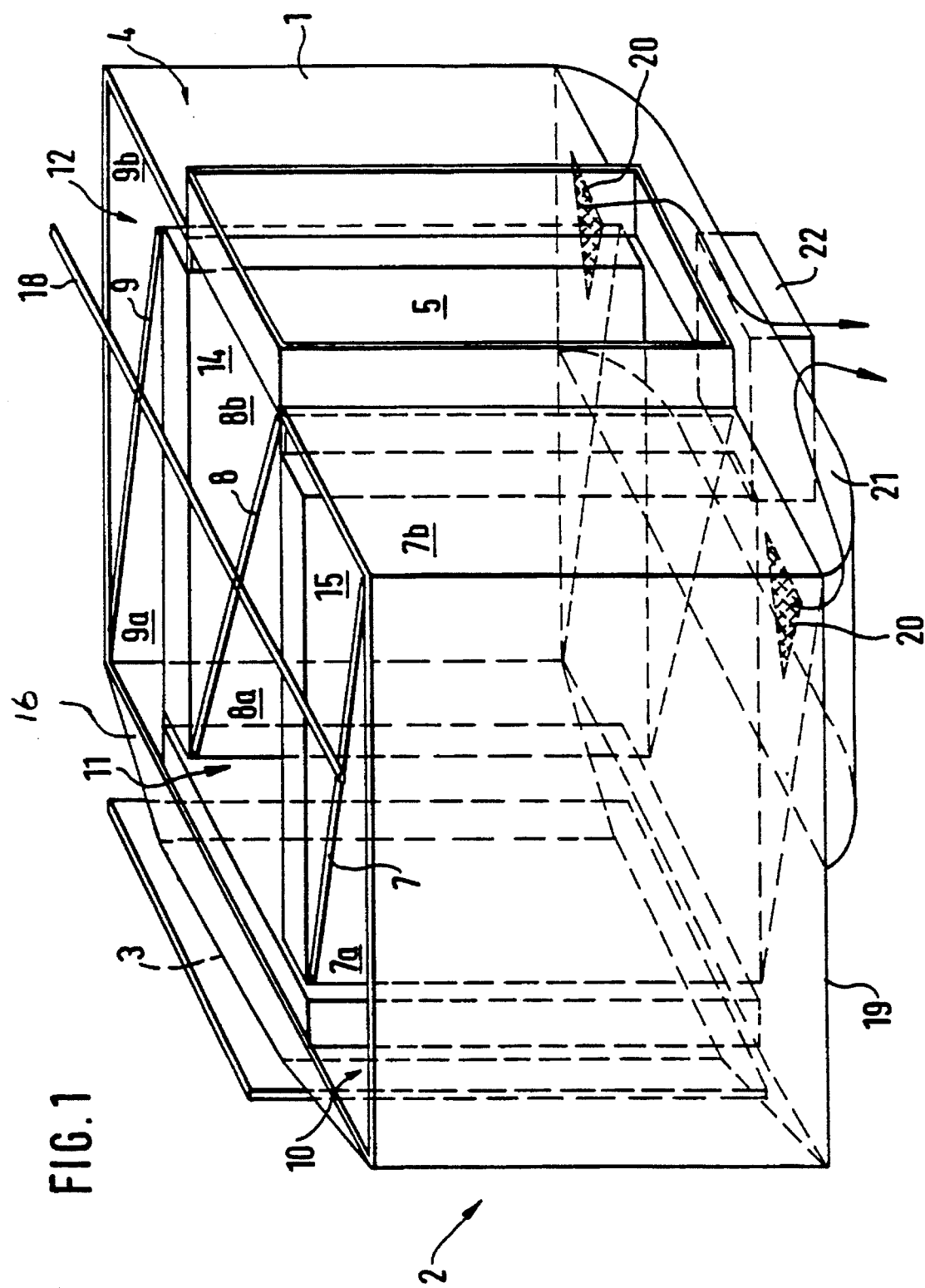
FIG. 1 is a perspective view of an apparatus according to the invention for air dehumidification.
Figure 2:
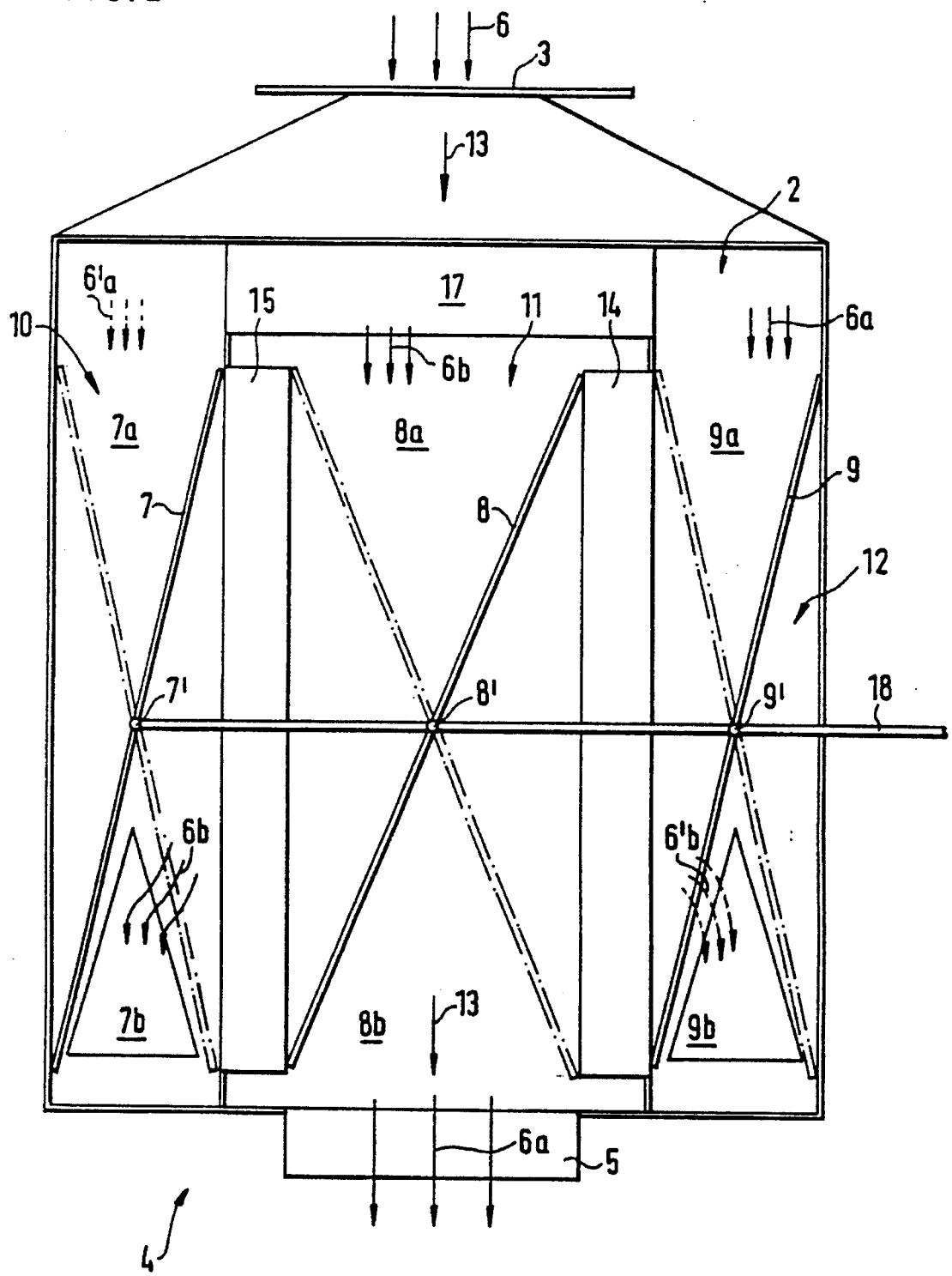
FIG. 2 is a plan view of the apparatus according to FIG. 1.

The apparatus represented in FIGS. 1 and 2 for dehumidifying the air fed to a passenger compartment of a motor vehicle comprises a housing 1, which has on one end face 2 an opening 3 for the connection of a discharge air duct, which carries away moist air from a passenger compartment. On the end face 4 opposite the end face 2 there is formed a connection stub 5, which is connected to a supply air duct which directs the dried air flow into the passenger compartment.

Formed in the housing 1 are three air chambers 10, 11, 12, which—as FIGS. 1 and 2 show—lie next to one another transversely with respect to the main direction of flow 13. The outer air chambers 10 and 12 form secondary air chambers, between which the main air chamber 11 lies. The main air chamber is separated from the secondary air chambers by wall elements 14, 15; the wall elements 14, 15 consist of hygroscopic material, in particular of a sorbent, such as zeolite, silica gel or aluminum hydroxide. The wall elements 14, 15 extend substantially parallel to the main direction of flow 13 over substantially the entire length of the air chambers 10, 11 and 12.

In each air chamber 10, 11 and 12 there is arranged an air flow control element, which is preferably designed as a damper 7, 8, 9 lying substantially parallel to the wall element 14, 15. Each damper 7, 8, 9 is such that it can be swiveled about a spindle 7', 8', 9', which lies parallel to the wall element 14 or 15, respectively, and is determined by the intersection line of the diagonal surface areas crossing the air chambers. In the plan view according to FIG. 2, the spindles 7', 8', 9' thus lie precisely at the chamber mid-point.

Each damper 7, 8, 9 lying in an air chamber 10, 11, 12 divides the chamber diagonally, whereby the air inlets 7a, 8a and 9a facing the end face 2 and air outlets 7b, 8b and 9b facing the end face 4 are formed.

The discharge air drawn out of the passenger compartment (not shown) via a discharge air duct flows in the direction of arrow 13 into a diffuser 16, which is arranged ahead of the air inlets 7a, 8a and 9a and by means of which the air is distributed to the air inlets. In this case, the quantity of air used for desorption is about half in comparison with the quantity of air flow used for adsorption. To realize this, the heating element and/or the cutout of the exhaust air stub are correspondingly designed. In the position of the dampers 7, 8, 9 represented in FIGS. 1 and 2 (solid line), the partial air flow 6a entering the air inlet 9a of the secondary air chamber 12 is directed by the damper 9 in the direction of the wall element 14, flows through the wall element 14 and passes over into the air outlet 8b of the main air chamber 11. From the air outlet 8b, the dried partial air flow 6a flows into the connection stub 5 and is fed via the supply air duct back to the passenger compartment—if appropriate with fresh air and/or ambient air mixed in.

A second partial air flow 6b enters the air inlet 8a of the main chamber 11, and initially flows through a heater 17, which is arranged ahead of the air inlet 8a of the main air chamber 11. The heater may be a heat exchanger fed by the waste heat of a drive motor, for example of a combustion engine; the heater is preferably an electrical resistance heater comprising in particular Positive Temperature Coefficient elements.

The heated partial air flow 6b is directed by the air damper 8 to the wall element 15, flows through the wall element 15 and thereby takes up the air moisture adsorbed in the sorbent of the wall element 15. The moist air flow 6b enters the air outlet 7b of the secondary air chamber 10 and is taken up via an exhaust air opening 20, preferably provided in the bottom of the air chamber, in an exhaust air manifold 21, formed underneath the housing 1, and is carried away via an exhaust air stub 22. Into the manifold 21 there opens both the exhaust air opening 20 of the first secondary air chamber 10 and the exhaust air opening 20 of the second secondary air chamber 12.

In the position shown of the damper 7, the air flow through the air inlet 7a of the secondary air chamber 10 is blocked; in the same way, the air outlet 9b of the secondary air chamber 12 is blocked.

The dampers 7, 8 and 9 are preferably actuated by a joint damper drive 18, whereby the air flow control elements (dampers 7, 8, 9) are coupled to one another position-dependently. By means of the damper drive 18, the dampers 7, 8 and 9 are adjusted into the position shown by broken lines in FIG. 2, in which the air inlet 7a from then on directs a partial air flow 6'a through the regenerated sorbent of the wall element 15, in order then to feed this flow via the air outlet 8a of the main air chamber as a dry air flow to the passenger compartment. The heated partial air flow 6b still entering the air inlet 8a of the main air chamber 11 flows through the wall element 14 of the desorption air flow. The moisture adsorbed in the sorbent is driven out and carried away by the air flow 6'b. The air flow 6'b enters the exhaust air manifold 21 via the exhaust air opening 20 in the bottom of the housing 1 and is carried away to the outside via the exhaust air stub 22.

Figure 3:
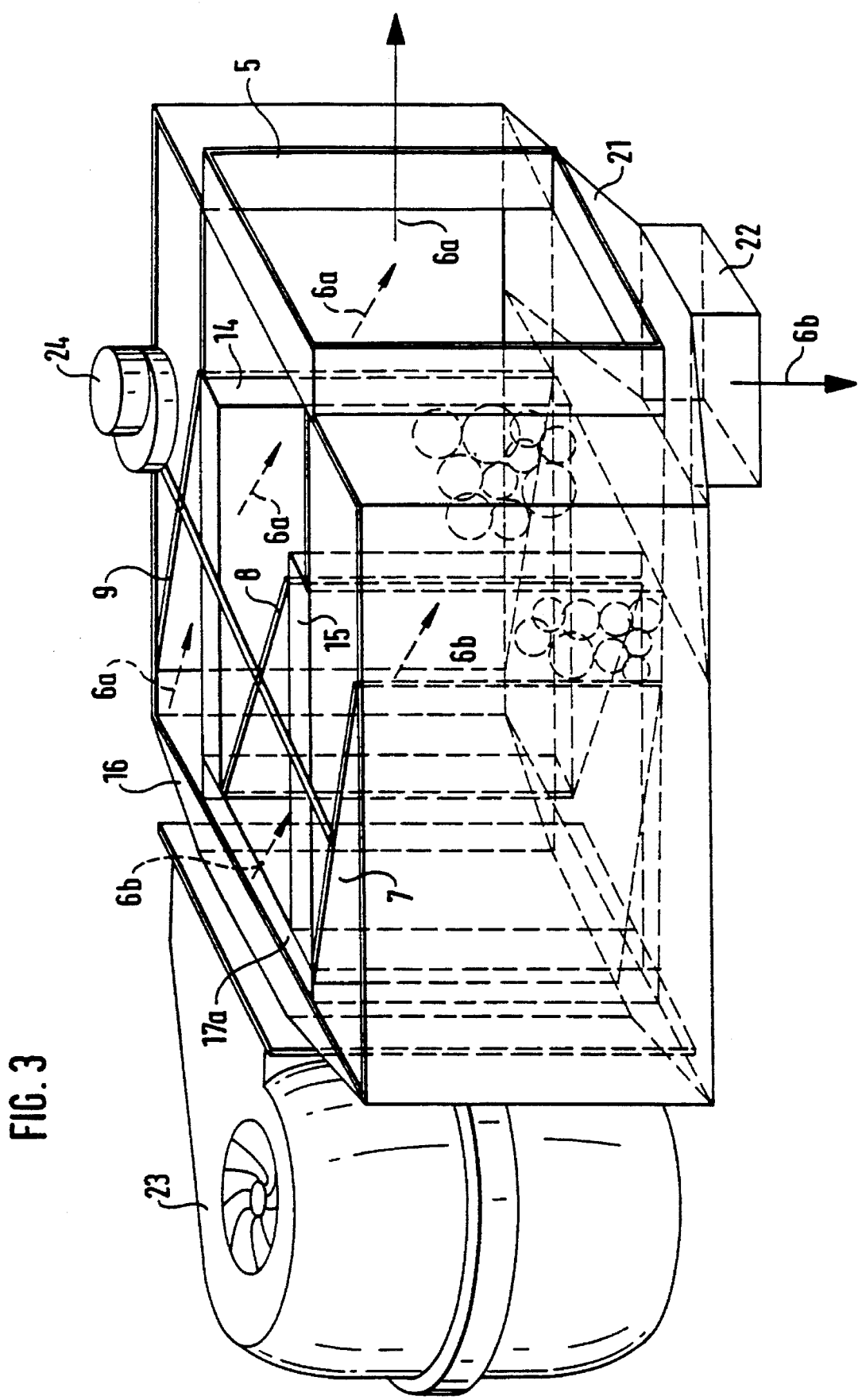
FIG. 3 is a perspective view of a further apparatus in a first position of the air flow control elements.
Figure 4:
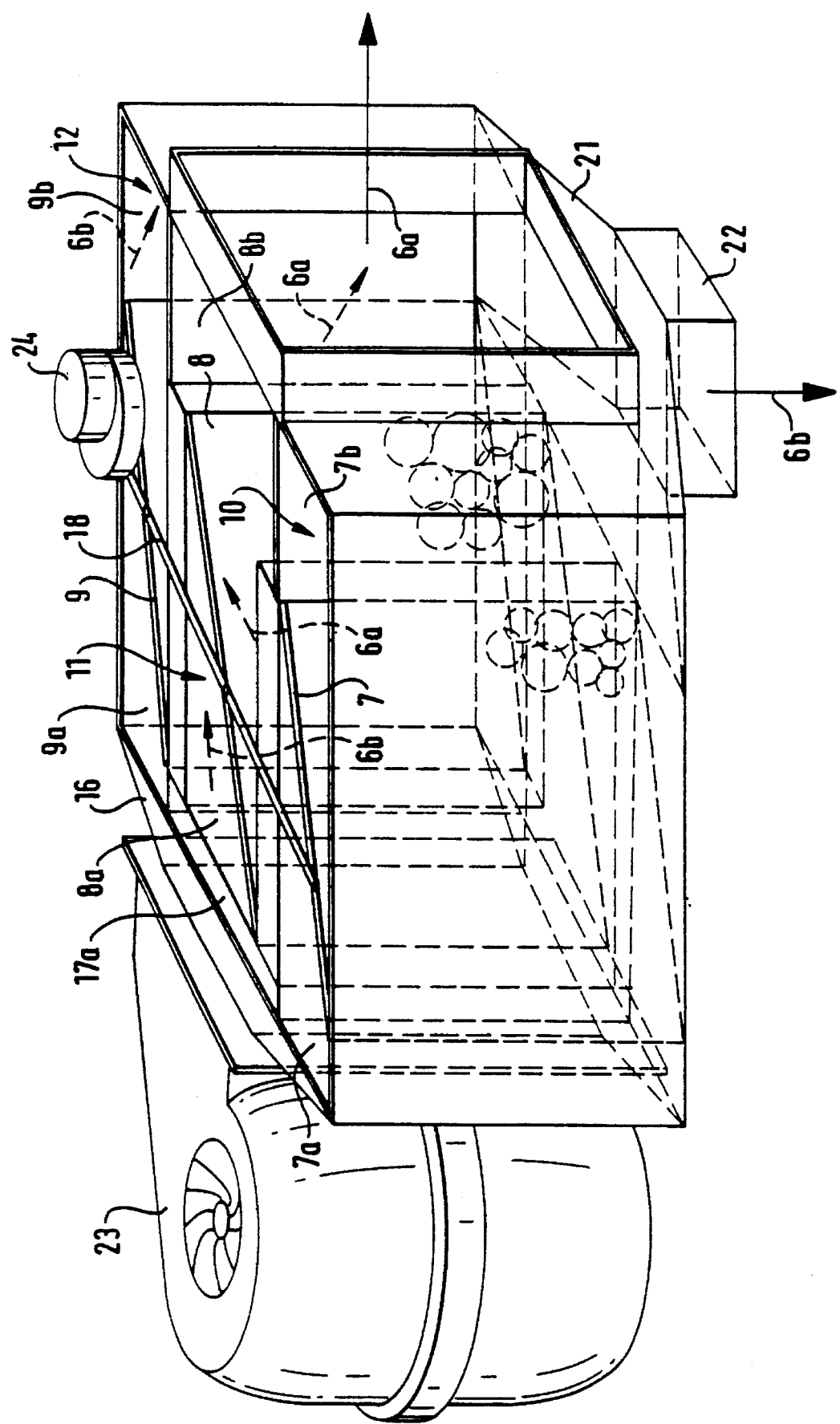
FIG. 4 is a perspective representation of the apparatus according to FIG. 3 in a second position of the air flow control elements.

As shown in particular in FIGS. 3 and 4, each wall element 14, 15 comprises an air-permeable cage, which may comprise a thin-mesh wire mat or perforated metal sheet. The sorbent is introduced into this cage as a loose fill, the thickness of the loose fill determining the wall thickness of the wall element being about 2 cm and the grain size being on average 3 mm. Such a loose fill ensures low pressure losses below 3 mbar at an air rate of about 1 m/s. Each wall element comprises about 450 g of sorbent, whereby an operating period per cycle of about 10 minutes can be accomplished.

Figure 5:
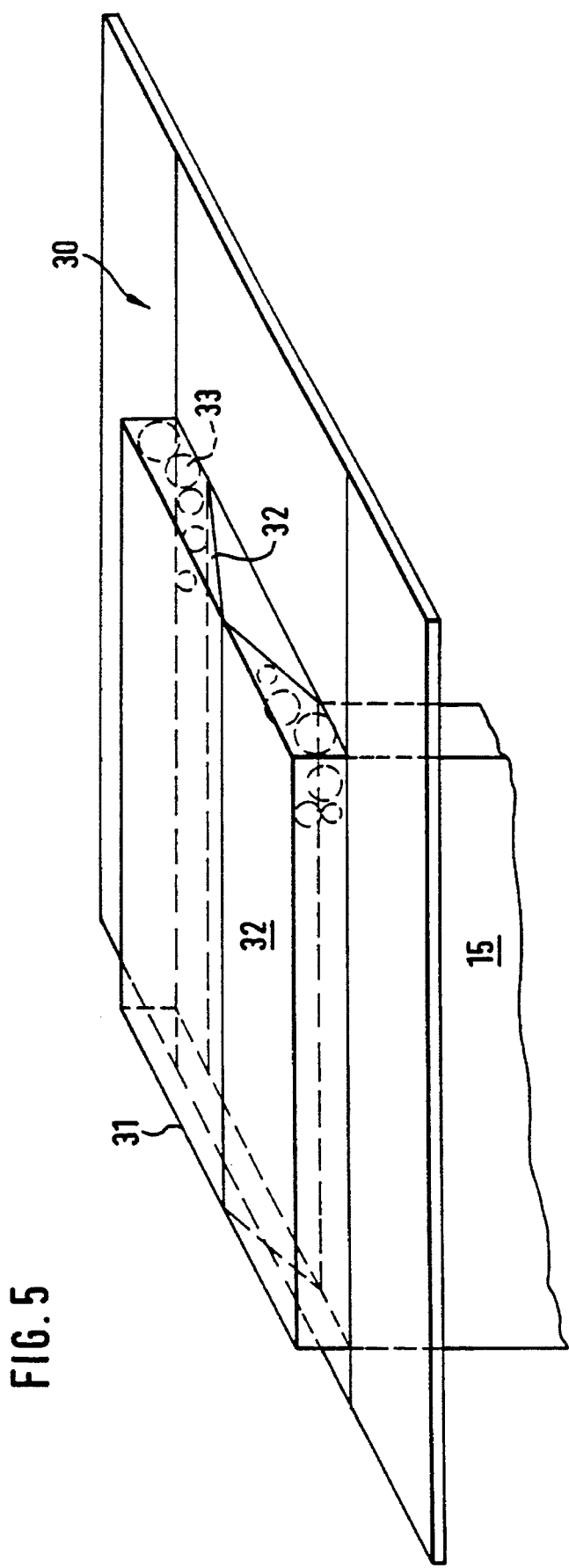
FIG. 5 is a diagrammatic representation of a cover for the housing of the apparatus according to FIG. 3.

The apparatus is arranged such that the force of gravity in the plane of the wall elements 14, 15 acts in the direction of the bottom 19 of the housing. The housing itself is in this case closed by a cover 30, as is shown in FIG. 5 for a housing according to FIG. 3. The cover is open in the region above the wall elements 14, 15. In the cover 30 there is a store chamber 31, which exhibits a bottom 32 dropping to the upper edge of the wall elements 14, 15. A loose fill 33 introduced into the store chamber 31 is thus transported into the cage of the respective wall element 14, 15 by the force of gravity. As a result, it is ensured that any settlement of the loose fill occurring due to vibrations and abrasion is compensated. A leakage flow of the air flow to be treated bypassing the wall element 14, 15 is thus ruled out to a great extent.

In the apparatus shown in FIGS. 3 and 4, the air chambers 10 and 12 are extended on the outflow side beyond the end of the air chamber 11 and connected to each other via a manifold 21. Connected to the manifold 21 in a known way is an exhaust air stub 22 for carrying away the moisture-charged desorption air.

The diffuser 16 is preferably connected to a fan 23, which draws exhaust air out of the passenger compartment.

The damper drive 18 is controlled by a motor 24, which either effects a switching over of the dampers from the first position into the second position under time control or performs the switching over as a function of the degree of drying of the air flow. In the exemplary embodiment according to FIGS. 3 and 4, an electrical resistance heater 17a, which preferably comprises PTC elements, is provided as the heater.

In the first position of the dampers 7, 8, 9, shown in FIG. 3, the one partial air flow 6a flows through the wall element 14 and leaves as the dried partial air flow 6a at the connection stub 5. The partial air flow 6b heated by the resistance heater 17a enters the air inlet 8a of the main air chamber 11, flows through the wall element 15 and desorbs the sorbent; the moisture-charged partial air flow 6b is carried away via the manifold 21 and the exhaust air stub 22.

Figure 6:
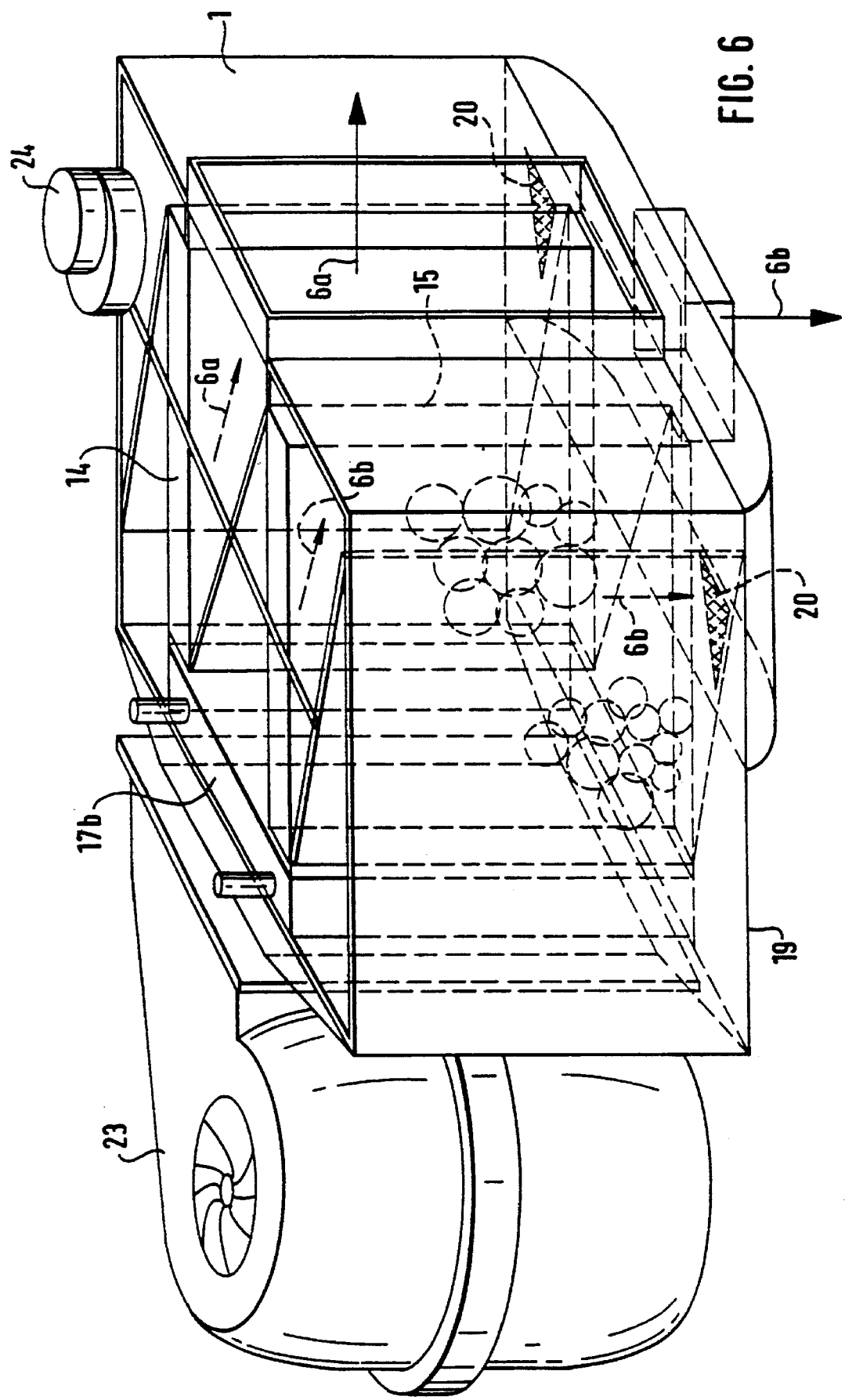
FIG. 6 is an apparatus corresponding to the apparatus according to FIG. 1 with a heat exchanger as the heater.

In the exemplary embodiment according to FIG. 6, a heat exchanger 17b is provided as the heater. Otherwise, the construction of the apparatus according to FIG. 6 corresponds to that according to FIG. 1, for which reason the same reference numerals are used for the same parts. It should additionally be noted that the exhaust air openings 20 in the bottom 19 of the housing 1 or of the secondary air chambers are arranged and designed in such a way that, in the respective damper position, the air outlet 7b or 9b is connected to them; in this case, care must be taken that the exhaust air opening 20 cannot be congruent with the air inlet 7a or 9a in any position of the dampers 7 and 9. The shape of the exhaust air opening 20 is preferably triangular.

Figure 7:
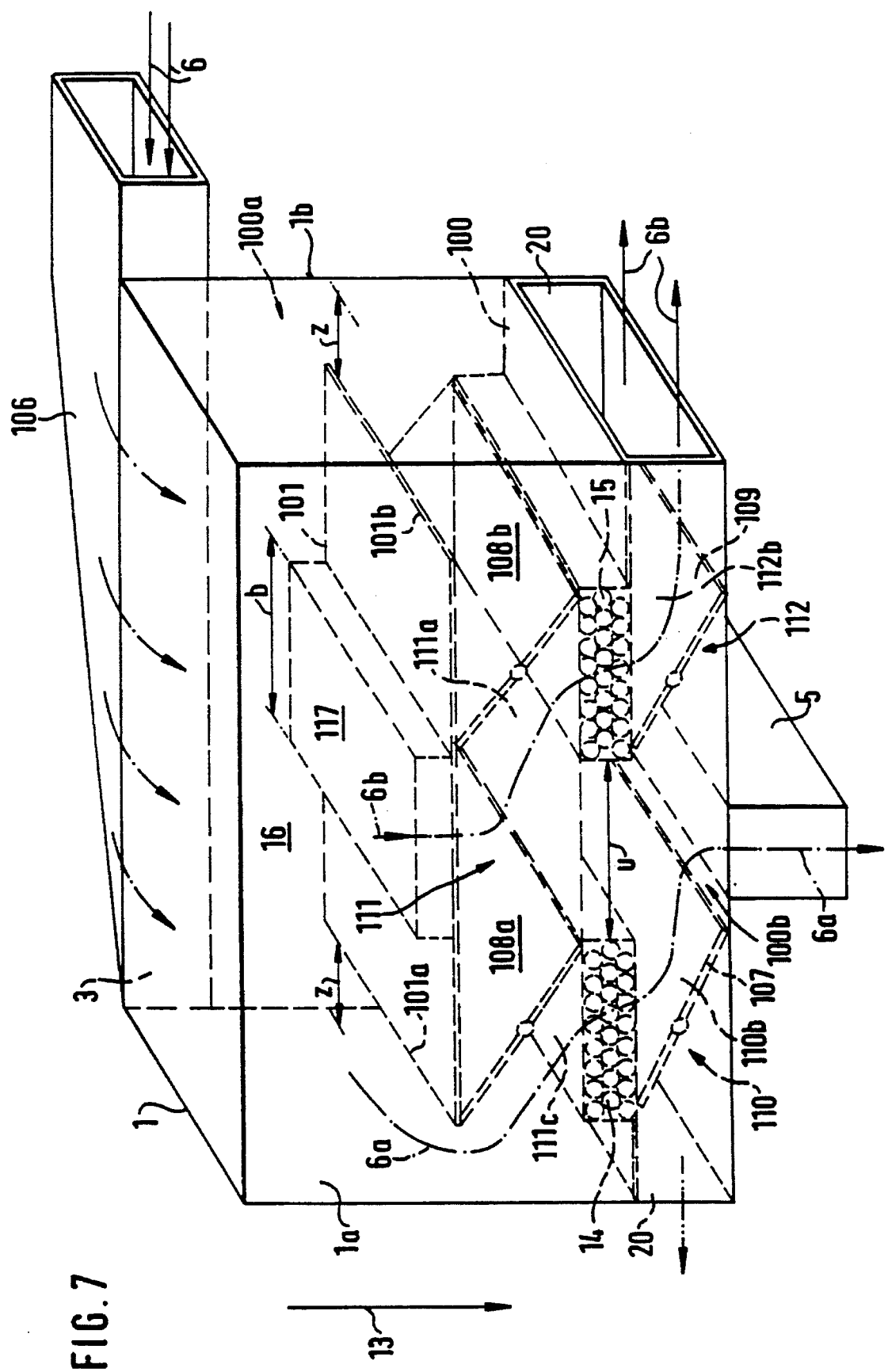
FIG. 7 is another exemplary embodiment of the apparatus, with wall elements lying transversely with respect to a main direction of flow.
Figure 8:
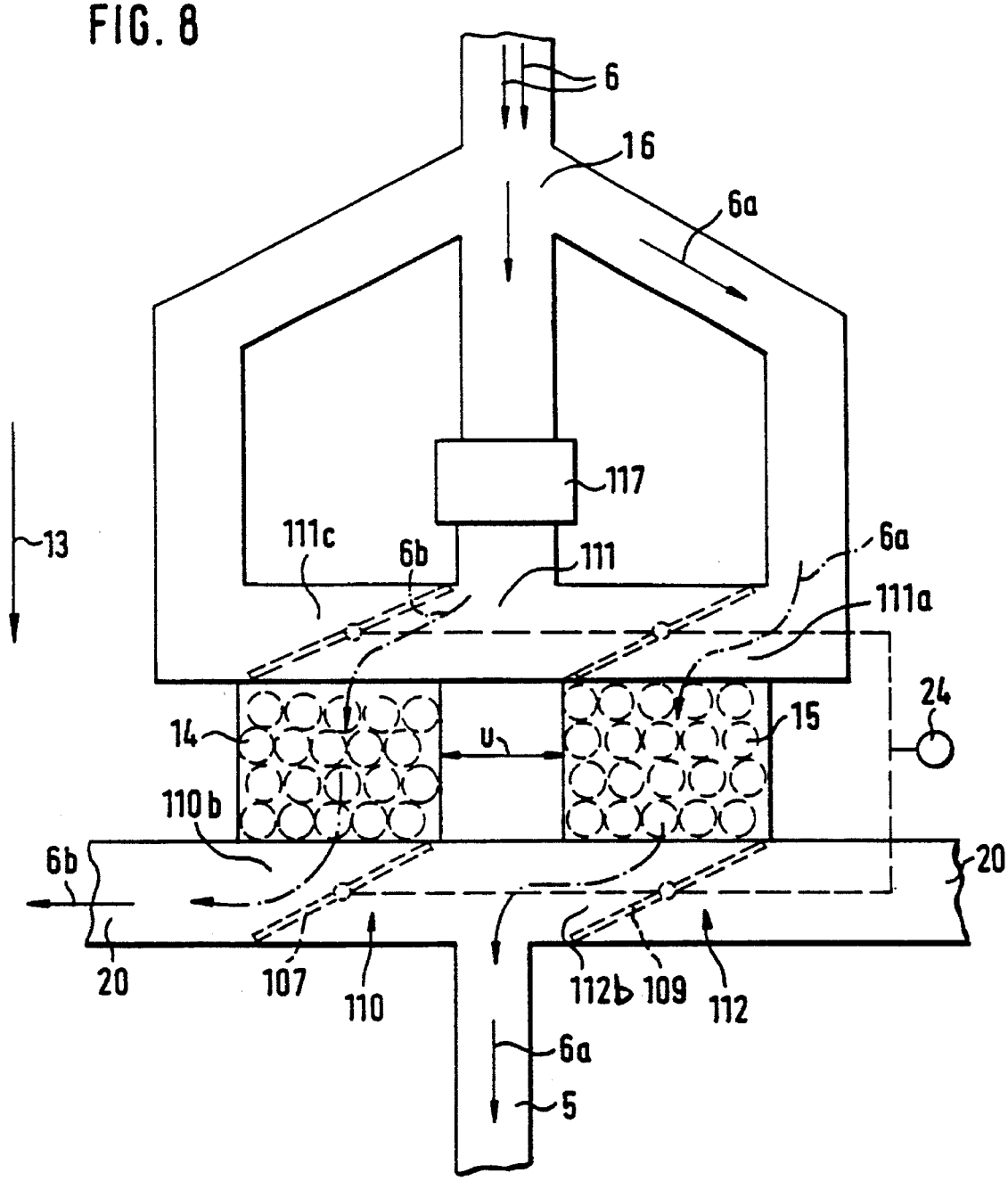
FIG. 8 is a diagrammatic representation of the apparatus according to FIG. 7.

In FIGS. 7 and 8 there is shown an exemplary embodiment of the apparatus according to the invention in which the wall elements 14 and 15 lie approximately in a plane transverse to the main direction of flow 13 of the air flow 6. This plane is formed by a housing partition 100, which divides the housing 1 into an upper air space 100a and a lower air space 100b. The housing partition 100 bears the wall elements 14, 15, which preferably run from the one end face 1a of the housing 1 to the other end face 1b of the housing. In the exemplary embodiment according to FIGS. 7 and 8, the two wall elements lie apart from each other by a distance u, which is determined in particular by the width b of the heater, which in the exemplary embodiment shown is a heat exchanger 117. The heat exchanger is connected in particular to a coolant circuit of an engine, preferably of a combustion engine.

The two air spaces 100a and 100b are connected to each other via the wall elements 14 and 15.

In the lower air space 100b there are arranged the secondary air chambers 110 and 112, which—seen in the main direction of flow 13—lie congruently underneath a wall element 14 and 15, respectively. In the secondary air chambers 110, 112 there are arranged diagonally lying dampers 107, 109 as air flow control elements, which connect an air outlet 110b, 112b, bounded by the damper 107, 109 and the wall elements 14, 15, either to an exhaust air opening 20 or via a connection stub 5 to the supply air duct of a passenger compartment. Like the wall elements 14, 15, the secondary air chambers 110, 112 and the dampers 107, 109 extend from the one end face 1a to the other end face 1b of the housing 1.

In the position of the air flow control elements or dampers 107, 109 shown in FIG. 7, the air outlet 110b is connected to the space between the dampers, which is in connection with the supply air duct via the connection stub 5. The air outlet 112b is connected to a lateral exhaust air opening 20 of the housing 1. In the position of the dampers 107, 109 shown in FIG. 8, the air outlet 110b of the second secondary air chamber 110 is connected to the lateral exhaust air opening 20 of the housing 1, while the air outlet 112b of the first secondary air chamber 112 is connected to the air space which is bounded by the partition 100, the damper 109 and the housing 1 and is in connection with the supply air duct via the connection stub 5.

On the side of the housing partition 100 facing away from the secondary air chambers 110, 112 there is provided an intermediate housing wall 101, which runs from the one end housing wall 1a to the other end housing wall 1b. On the side of the intermediate housing wall 1 facing away from the wall elements 14, 15 there is thus formed the diffuser 16, while between the intermediate housing wall 101 and the housing partition 100 there is formed the main air chamber 111. The arrangement is in this case envisaged such that—seen in the main direction of flow 13 of the air flow 6—the side borders 101a and 101b of the intermediate housing wall 101 lie at distance z from the side walls of the housing 1, whereby air passages from the space of the diffuser 16 to the main air chamber 111 are produced. The side borders 101a and 101b lie—seen in the main direction of flow 13—congruently with respect to the narrow sides, facing away from each other, of the wall elements 14 and 15.

In the main air chamber there are arranged two dampers 108a and 108b, which—seen in the main direction of flow 13—lie congruently and substantially parallel to the air dampers 107 and 109 of the secondary air chambers 110 and 112. The space between the dampers 108a and 108b is in this case connected via the heat exchanger 117 to the diffuser 16. The diffuser 16 is connected via an inlet housing 106 to the discharge air duct of the passenger compartment, the inlet housing 106 opening out into the diffuser 16 via an inlet opening 3 running over the entire width of the housing.

The dampers 107, 108a, 108b, 109 are coupled to one another position-dependently, said dampers lying in planes approximately parallel to one another in their end positions. In a first position, the dampers 108a and 108b of the main air chamber 111 in this case connect the air inlet 111a or 111c, respectively, (FIG. 8) directly to the diffuser 16, so that—as shown in FIG. 7—in the first position of the dampers the partial air flow 6a is ducted through the wall element 14 and is carried away as the dried air flow via the connection stub 5. The second partial air flow 6b, as the desorption air flow, first of all flows through the heat exchanger 117, is heated there and is subsequently ducted via the second wall element 15, in order to drive out the air moisture stored in the adsorption material. The desorption air flow 6b is carried away as the exhaust air flow via the exhaust air opening 20.

In the position of the air dampers 107, 108a, 108b, 109 shown in FIG. 8, the air inlet 111a is connected directly to the diffuser 16, so that the partial air flow 6a is ducted via the second wall element 15 and can be fed via the connection stub 5 as the dry air flow to the passenger compartment. The desorption air flow 6b entering the main air chamber 111 via the heat exchanger 117 passes through the first wall element 14 and is carried away via the air outlet 110b of the second secondary air chamber 110 and the exhaust air opening 20 in the housing 1.

In the exemplary embodiment according to FIG. 9, which corresponds in its basic construction to that according to FIGS. 8 and 9, for which reason the same reference numerals are used for the same parts, each wall element 14, 15 is permanently assigned a heat exchanger 117a and 117b, matched in particular in size. Seen in the main direction of flow 13, the wall elements 14 and 15 and the heat exchangers 117a and 117b are of congruent designs. A wall element and a heat exchanger form an air-permeated structural unit 200, with which it is possible for an air flow to be fed to the wall element 14 or 15 exclusively via the heat exchanger 117a or 117b, respectively. The heat exchangers thus form the only flow connection between the diffuser 16 and the wall element 14 or 15. The structural units 200 in this case lie approximately in a plane which may be formed by the housing partition 100, which divides the housing 1 into the diffuser 16 and the lower air space 100b. There is no need for a main air chamber.

The heat exchangers 117a and 117b are connected to the coolant circuit 301 of an engine, in particular of a combustion engine 300. In the respective supply lines 302a and 302b to the heat exchangers there are arranged valves 217a and 217b, respectively, which may be designed as two-position valves. The operation of the valves is such that, with valve 217a open, the valve 217b is closed, and vice versa. The open position of the valves 217a and 217b is assigned a corresponding position of the dampers 107 and 109 of the secondary air chambers, it being possible for the dampers to be actuated by means of a position motor 24, also switching the valves. In the position drawn in FIG. 9, the valve 217b is open, so that the heat exchanger 117b is operated. The valve 217a is closed, so that the cooling water supply line 302a is blocked. Assigned to these valve positions is the position shown of the dampers 107, 109, so that a partial air flow 6b ducted via the heat exchanger 117b is heated in order to desorb the sorbent in the wall element 14. On account of the position of the damper 107, this desorption air flow 6b is carried away through the exhaust air opening 20. The partial air flow 6a fed to the wall element 15 from the diffuser 16 via the heat exchanger 117a is not heated, since no heat energy flows to the heat exchanger 117a on account of the closed valve 217a. On account of the position of the damper 109, this partial air flow 6a flows to the connection stub 5, in order to be fed as the dry air flow to the passenger compartment. If the sorbent in the wall element 14 is exhausted, the valves and dampers are switched over correspondingly.

Additionally advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus adapted for reducing the air moisture in a passenger compartment of a motor vehicle, comprising:

a housing having a common inflow adapted to introduce air into the housing from the passenger compartment, a first outflow adapted to discharge inflow air into the passenger compartment, and a second outflow adapted to discharge the inflow air to the ambient;

a first secondary air chamber and a main air chamber in the housing, the secondary air chamber being separated from the main air chamber by an air-permeable wall element of hygroscopic material;

a second secondary air chamber separated from the main air chamber by a second air-permeable wall element of hygroscopic material; and at least one air flow control element movable between a first position and a second position for controlling the air flow, wherein in the first position, the air flow control element directs the inflow air from the common inflow to the first secondary air chamber, through the first wall element, through the main air chamber, and exited through the first outflow as a dried air and directs the inflow air from the common inflow to the main air chamber, through the second wall element, through the second secondary chamber, and exited through the second outflow as a desorption air, wherein in the second position the air flow control element directs the desorption air through the first wall element and the inflow air to be dried to the second wall element.

2. An apparatus as claimed in claim 1, wherein in the first position the inflow air enters from an upstream portion of the first secondary air chamber and flows through a downstream portion of the main air chamber, and enters an upstream portion of the main air chamber and flows through a downstream portion of the second secondary air chamber.

3. An apparatus as claimed in claim 1, wherein the air flow control element is a damper disposed in each air chamber, wherein the damper in the first position and the second position lies diagonally across each air chamber to produce separate air flow paths within the housing.

4. An apparatus as claimed in claim 3, wherein each of the air flow paths includes an air inlet, an air outlet, and the wall element lying between the air inlet and the air outlet.

5. An apparatus as claimed in claim 4, wherein the air inlets lie on one end face of the housing.

6. An apparatus as claimed in claim 5, wherein the air inlets are jointly communicating with the inflow.

7. An apparatus as claimed in claim 6, further comprising a diffuser disposed between the air inlets and the inflow.

8. An apparatus as claimed in one of claim 6, further comprising a heater disposed in an air inlet to the main air chamber.

9. An apparatus as claimed in claim 8, wherein said heater covers an entire inlet cross section of the air inlet to the main chamber.

10. An apparatus as claimed in claim 8, wherein the heater is a heat exchanger adapted to be fed by excess heat of a combustion engine or exhaust gases of an engine, and wherein the heat exchanger can be selectively switched off.

11. An apparatus as claimed in claim 8, wherein the heater is an electrical resistance heater which includes PTC elements.

12. An apparatus as claimed in claim 1, further comprising a plurality of air flow control elements which are coupled together and position-dependent on one another.

13. An apparatus as claimed in claim 1, wherein the wall elements lie such that they are aligned approximately along a main direction of an air flow through the housing.

14. An apparatus as claimed in claim 13, wherein the wall elements are approximately parallel to and spaced apart from one another.

15. An apparatus as claimed in claim 1, wherein the wall elements lie approximately in a plane next to one another and the main air chamber lies on one side of the plane and the secondary air chambers lie on the other side of the plane.

16. An apparatus as claimed in claim 15, wherein the plane is formed by a housing partition.

17. An apparatus as claimed in claim 16, wherein the housing partition includes the wall elements.

18. An apparatus as claimed in claim 15, wherein said at least one air flow control element comprises two dampers which are disposed within the main air chamber, said dampers respectively opening and closing an air inlet to the wall element to produce the first and second air flow.

19. An apparatus as claimed in claim 16, further comprising a heater assigned to each wall element.

20. An apparatus as claimed in claim 19, wherein the heater may be switched off.

21. An apparatus as claimed in claim 1, wherein the hygroscopic material is a sorbent selected from the group consisting of zeolite, silica gel, and aluminum hydroxide.

22. An apparatus as claimed in claim 21, wherein the wall element comprises an air-permeable cage containing a loose fill of sorbent particles of a grain size averaging approximately 3 mm.

23. An apparatus as claimed in claim 22, wherein each wall element is aligned approximately parallel to a direction of gravity and connected to a store chamber disposed thereabove.

24. An apparatus as claimed in claim 23, wherein the store chamber contains loose fill of sorbent particles.

25. A dehumidifying apparatus comprising:

a housing having a common inflow adapted to introduce inflow air into the housing, a first outflow adapted to discharge dehumidified air, and a second outflow adapted to discharge desorption air;

first and second air-permeable wall elements of hygroscopic material disposed within the housing;

an air flow control element movable between a first position and a second position for controlling air flow from the common inflow to the outflows, wherein in the first position the air flow control element directs inflow air from the common inflow through the first wall element to dry the first wall element, and the desorption air is exited through the second outflow, and directs the inflow air from the common inflow through the second wall element to dehumidify the inflow air, which is exited through the first outflow, and wherein in the second position the air flow control element directs the inflow air from the common inflow through the second wall element to dry the second wall element and the desorption air is exited through the second outflow, and directs the inflow air from the common inflow through the first wall element to dehumidify the inflow air, which is exited through the first outflow.

26. A dehumidifying apparatus as claimed in claim 25, further comprising three air chambers formed in the housing, the three air chambers being separated from each other by the first and second wall elements.

27. A dehumidifying apparatus as claimed in claim 25, wherein the air flow control element comprises a damper disposed within each chamber.

* * * * *